Nov. 7, 1939.                J. W. LEIGHTON                2,179,016
                                VEHICLE
                          Filed Feb. 19, 1937         3 Sheets-Sheet 1
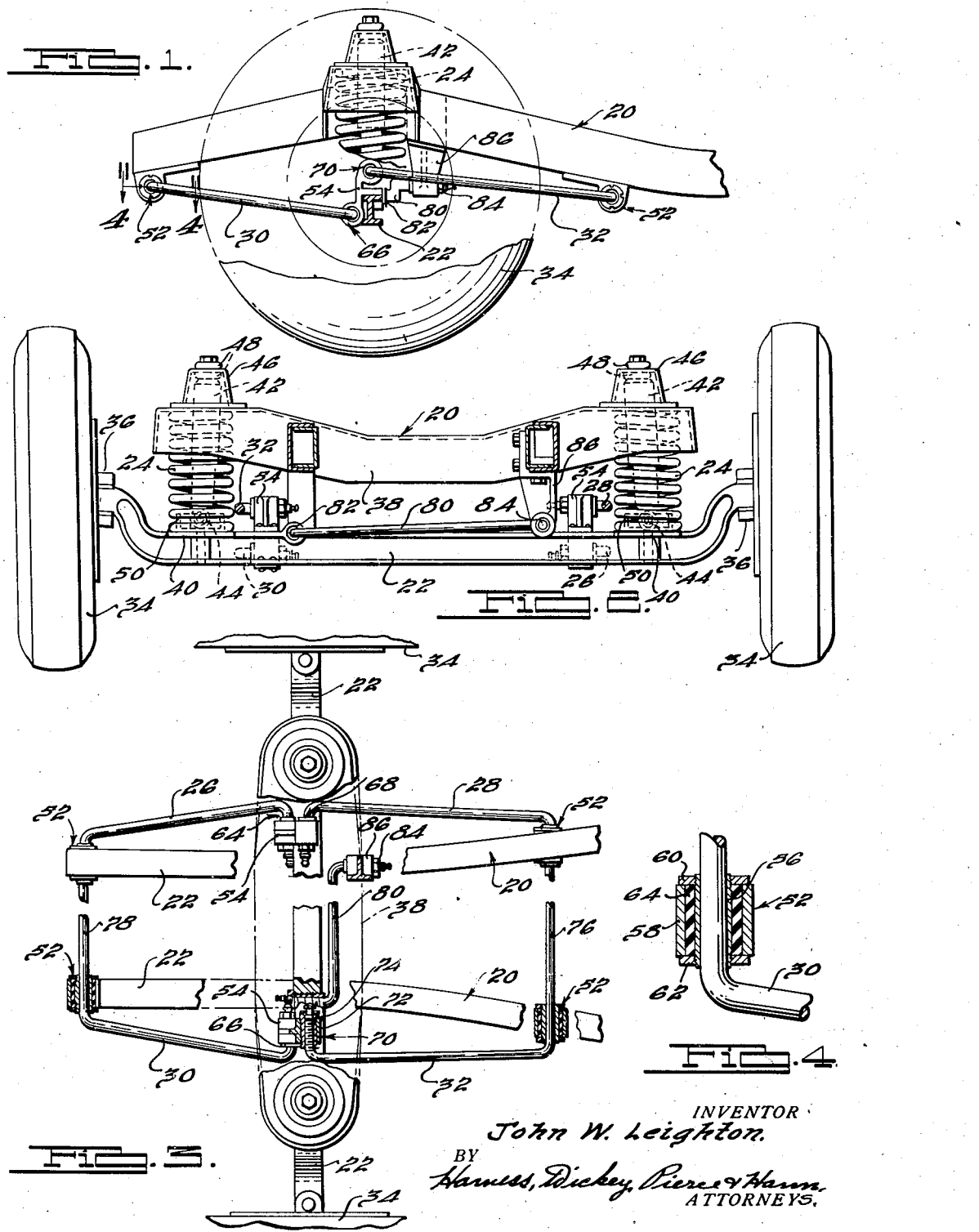

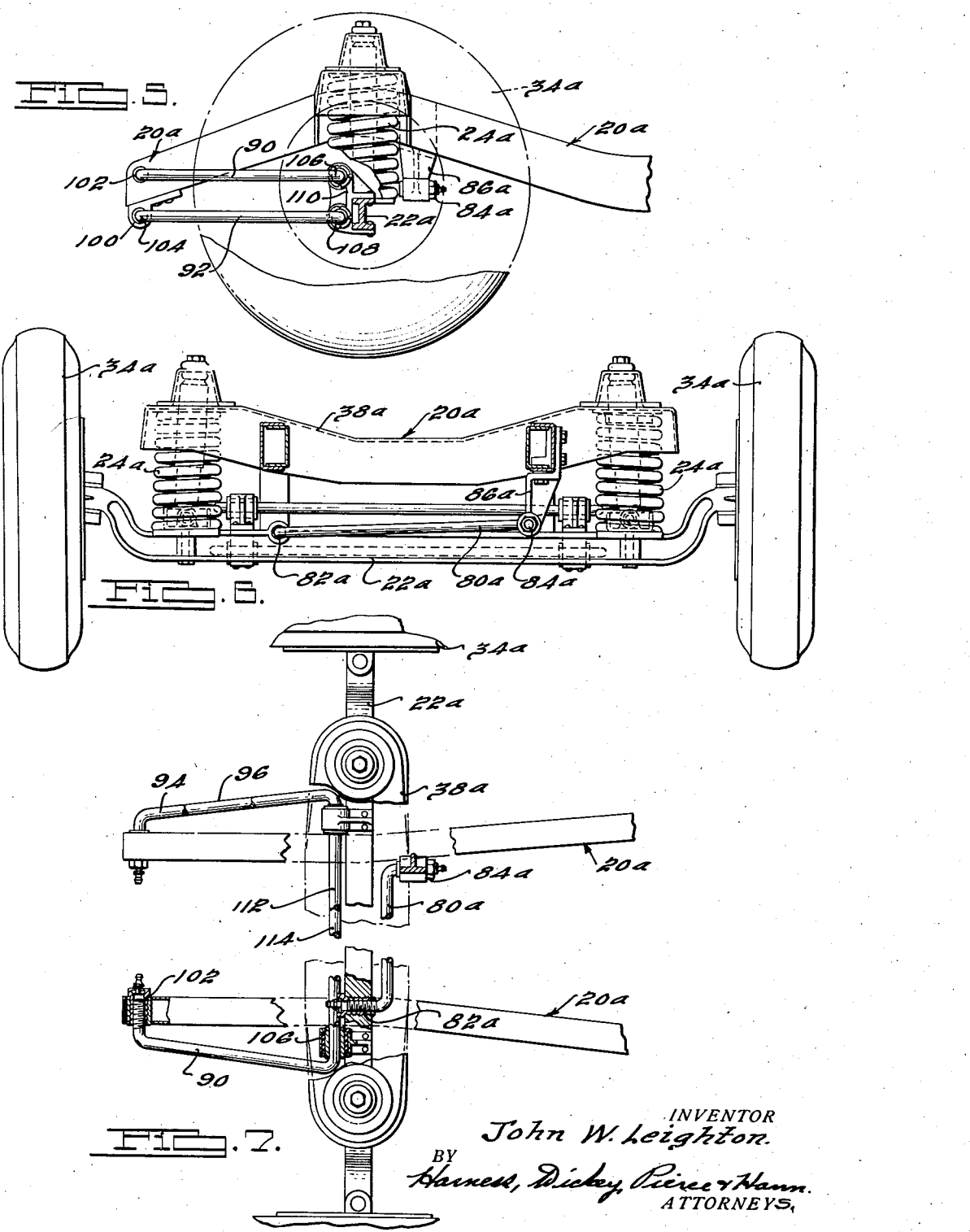

Nov. 7, 1939. J. W. LEIGHTON 2,179,016
VEHICLE
Filed Feb. 19, 1937 3 Sheets-Sheet 3
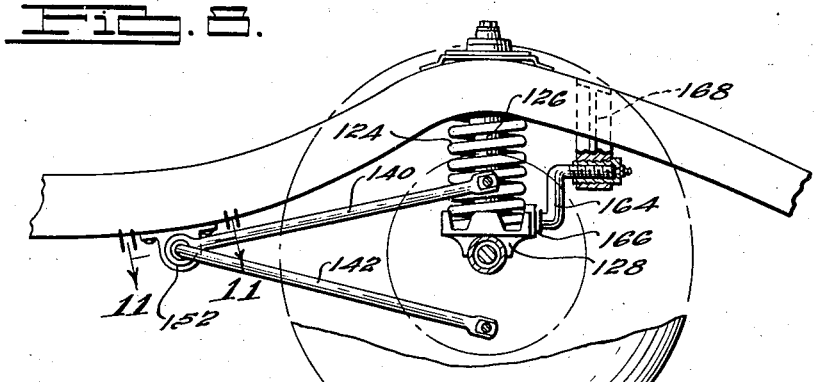
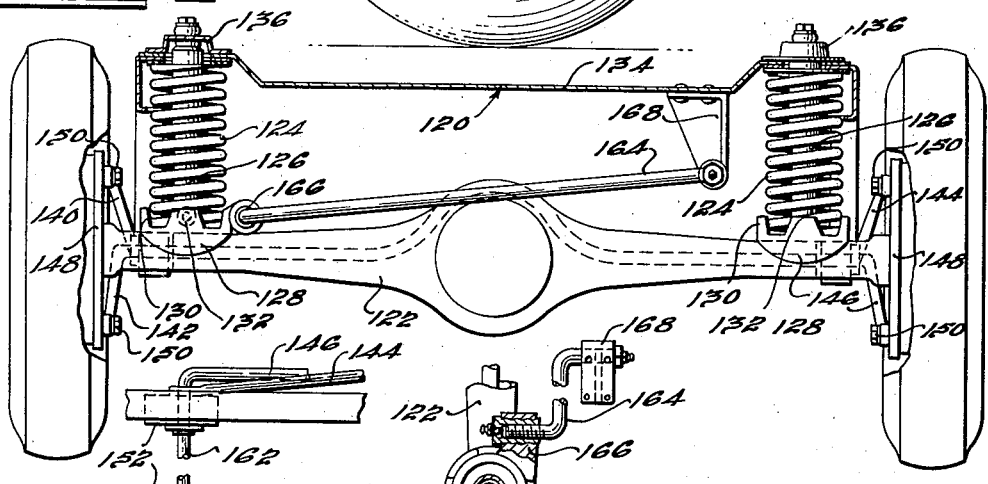
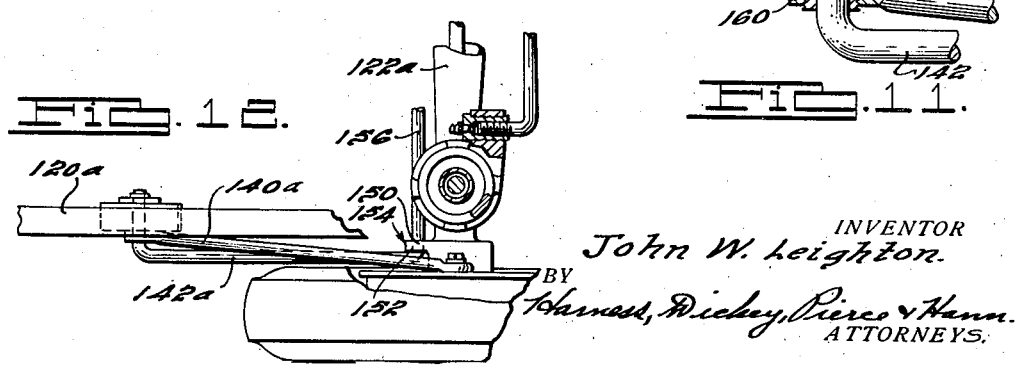
INVENTOR
John W. Leighton
BY
Harness, Dickey, Pierce & Hann
ATTORNEYS.

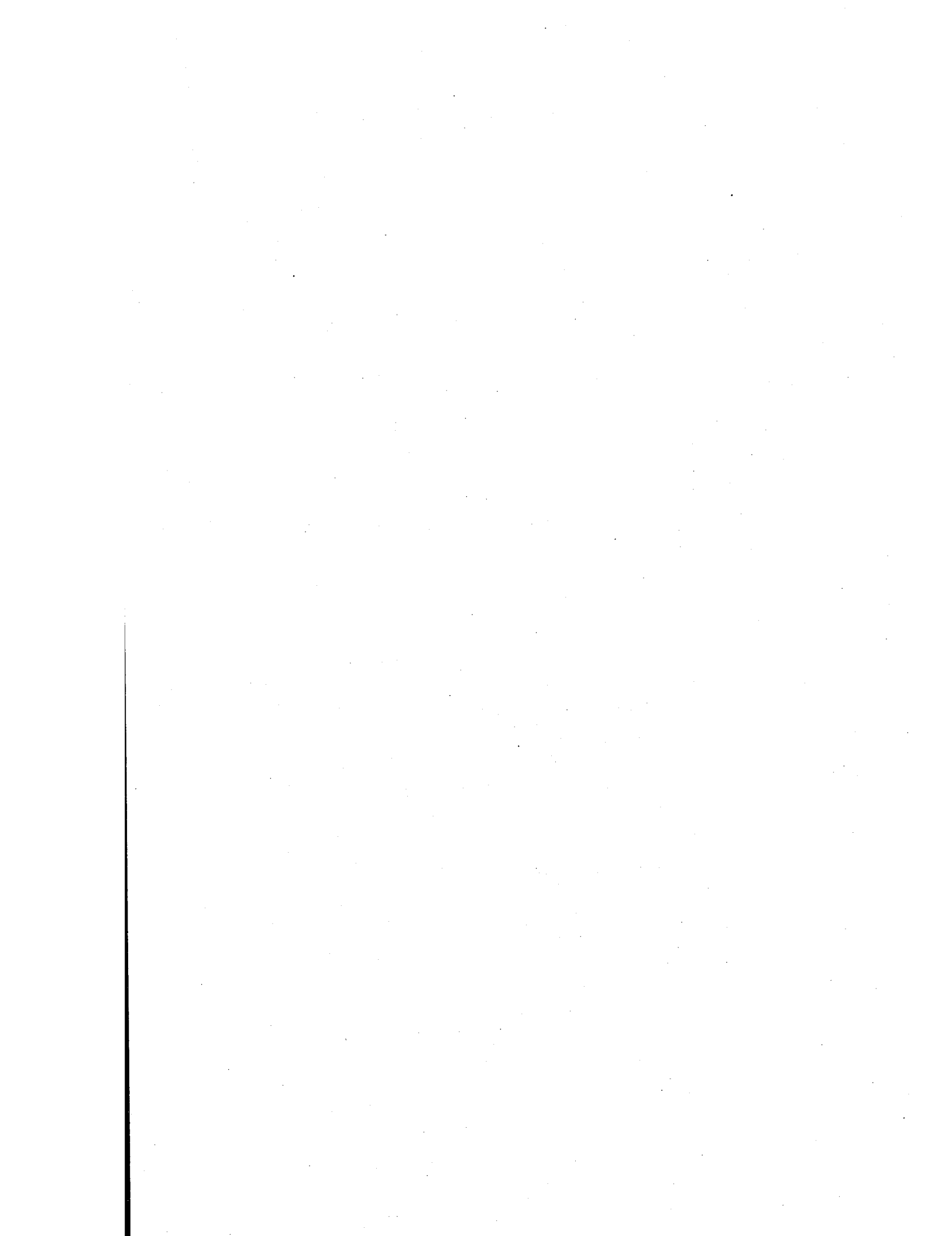

Patented Nov. 7, 1939

2,179,016

UNITED STATES PATENT OFFICE 2,179,016

VEHICLE

John W. Leighton, Port Huron, Mich.

Application February 19, 1937, Serial No. 126,659

3 Claims. (Cl. 267—66)

The present invention relates to vehicle wheel suspensions, and in the specific form illustrated provides an improved arrangement for connecting an axle of the so-called rigid type to a vehicle through one or more coil or helical springs.

Objects of the present invention are to provide a vehicle wheel suspension embodying an axle structure on which a wheel or wheels may be rotatively mounted, spring mechanism interposed between the axle structure and the vehicle frame, and additional elements cooperating between the axle and the frame for positively limiting any rotation of the axle structure about its own axis relative to the frame; to provide such a structure in which the axle structure, arranged either for front or rear wheel service, is of the so-called rigid type, and the spring mechanism comprises one or more springs of coil or helical type; to provide such a structure in which the means for preventing rotation of the axle structure about its own axis relative to the vehicle frame comprises one or more rods pivotally connected to each axle structure and to the frame in such a way as to permit vertical movement of the axle relative to the frame but to limit rotative movement of each axle structure about its own axis relative to the frame; and to provide such a structure in which the just mentioned rod or rods may be combined with the structure heretofore used to tend to cause movements of one wheel relative to the frame to be duplicated by the opposite wheel relative to the frame.

Further objects of the present invention are to provide a suspension of the above stated general character in which the axle supporting rods are arranged in pairs, one pair at each end of each axle structure, one rod of each pair being disposed to extend forwardly from the axle to the frame and the other rod of each pair being disposed to extend rearwardly from the associated axle to the frame; to provide such a structure in which the axle supporting rods are arranged in pairs, one pair being disposed at each end of the frame, and the rods of each pair being arranged as a parallel link system; to provide such a system in which corresponding rods at each side of the vehicle form part of a continuous connecting member disposed to tend to cause vertical movements of one wheel relative to the frame to be duplicated by the opposite wheel; and to provide such a system in which both rods of each such pair are pivoted to the frame at a common point.

With the above and other, as well as more specific objects in view, which appear in the following description and in the appended claims, preferred but illustrative embodiments of the invention are shown in the accompanying drawings, throughout which corresponding reference characters are used to designate corresponding parts, and in which:

Figure 1 is a view in side elevation of a vehicle suspension embodying the invention;

Fig. 2 is a view in elevation, taken from a point in the rear of the front axle, of the arrangement shown in Fig. 1;

Fig. 3 is a view in top plan of the arrangement shown in Figs. 1 and 2;

Fig. 4 is a detailed view taken along the line 4—4 of Fig. 1;

Fig. 5 is a view in side elevation of a modified embodiment of the present invention;

Fig. 6 is a view in front elevation, taken from a point in the rear of the front axle, of the arrangement shown in Fig. 5;

Fig. 7 is a top plan view of the arrangement shown in Figs. 5 and 6;

Fig. 8 is a view in side elevation of a further modification of the invention, applied to the rear axle of a vehicle;

Fig. 9 is a view in elevation, looking at a vehicle from the rear, of the arrangement shown in Fig. 8;

Fig. 10 is a partial top plan view of the arrangement shown in Figs. 8 and 9;

Fig. 11 is a fragmentary detailed view taken along the line 11—11 of Fig. 8; and Fig. 12 is a fragmentary view in side elevation of a further modification of the present invention.

Referring to the arrangement shown in Figs. 1 through 4, the frame 20 of an illustrative vehicle is suspended upon a front axle 22 of the rigid type through a pair of oppositely disposed helical or coil springs 24, and two pairs of axle supporting rods 26 and 28, and 30 and 32, respectively. The vehicle front wheels 34 are rotatively and dirigibly connected to the axle 22 through conventional knuckles 36, the details of which form no part of the present invention and have not been illustrated in detail.

The upper ends of the springs 24 are received within the opposite ends of the downwardly presenting channel shaped transverse frame member 38, and seat against the under side of the base thereof. The lower ends of the springs 24 are seated upon pads 40 provided on the upper side of the axle 22. Preferably and as illustrated, a conventionally telescopically arranged shock absorber 42 is arranged within each coil spring 24, the lower end of each thereof being pivotally connected to a clevis 44 associated with each pad 40 and rigidly secured thereto, and the upper end of each thereof being pivotally connected to a cap 46 secured to the upper side of the cross-member 38. In the illustrated arrangement, rubber pads 48 are connected between each cap 46 and the associated shock absorbers to provide a resilient joint adapted to permit a pivoting movement of each shock absorber with respect to the frame structure. As also illustrated, the clevises 44 are formed as part of supporting members having upstanding flanges 50, over which the ends of the springs 24 are received, and which act to retain the springs 24 in seated relation to the axle 22. Means to positively connect the ends of springs 24 to the axle and the frame member 28 have not been illustrated but may be used if desired.

The axle supporting rods 26 and 30 are pivoted to the frame in advance of the axles 22 by rotatable bearing assemblies designated as a whole as 52 and are connected to the axle 22 through brackets 54. The bearings 52 may be of any conventional or suitable type, but are illustrated comprising an inner sleeve 56 within which the associated rod is relatively freely rotatable. The sleeve 56 extends through a corresponding bearing opening provided in an outer sleeve 58, and is retained in position axially thereof as by nuts 60 and 62. A rubber cushioning ring 63 is interposed between the inner and outer sleeve 56 and 58, and thus permits a limited amount of bodily movement of the sleeve 56 and consequently of the associated rod with respect to the outer sleeve 58. The outer sleeve 58 may be rigidly secured to the frame 22 in any conventional way. A corresponding pivotal connection is provided between the rear ends of the axle supporting rods 28 and 32, and the forward ends of the rods are pivotally connected to the previously mentioned brackets 54.

The brackets 54 are rigidly secured to the upper side of the axle 22 in any suitable way, the bearings 64 and 66 associated with the rods 26 and 30 being disposed somewhat below the top of the axle 22, and the bearings 68 and 70 associated with the rods 28 and 32 being disposed somewhat above the level of the top of the axle 22 and somewhat to the rear of the bearings 64 and 66.

The several bearings 64, 66, 68 and 70 may be of any conventional and suitable type, but preferably and as illustrated, are of the threaded bearing type, constructed and arranged in accordance with the disclosure of applicant's Patent No. 1,924,448 granted August 29, 1933. As described in more detail in the patent, each bearing includes an outer tubular portion 72, and an intermediate bushing 74. The bushing 74 is provided with internal threads which mate with corresponding external threads on the associated rod, and with external threads which have the same lead as the internal threads and which mate with internal threads provided on the outer sleeve 72. The latter set of threads are lightly cut, so that, in assembling the elements, a jamb action is provided between the bushing and the sleeve, which secures the bushing in place within the sleeve and prevents further relative rotation between these two members.

In addition to the foregoing structure, the arrangement of Figs. 1 through 4 may and preferably does include conventional sway bracing, illustrated as comprising a sway rod 80, pivotally connected by a bearing 82 to the axle 22, and pivotally connected by a bearing 84 at the other end to a bracket 86 which extends downwardly from and is rigidly secured to the frame 20. The sway brace 80 functions in accordance with conventional usage to limit lateral displacement of the vehicle frame relative to the axle 22.

A further feature of the present arrangement is the combination of the axle supporting rods 26, 28, 30 and 32 with the so-called radius or torsion rods which tend to cause vertical movements of one wheel relative to the frame to be accompanied by corresponding vertical movement of the other wheel. To accomplish this, the rods 28 and 32 are formed integrally with each other and have a connecting portion 76, and the rods 26 and 30 are formed integrally with each other and have a connecting portion 78.

Considering the operation as a whole of the arrangement described above, it will be appreciated that all of the vehicle load applied from the frame 20 to the axle 22 is transmitted thereto through the coil springs 24 and the shock absorbers 42 which may, of course, be properly designed to afford a highly desirable and effective riding quality. In each vertical position of each end of axle 22 relative to the frame 20, axial rotation thereof is positively limited by the axle supporting rods 26 and 28 and 30 and 32, respectively, only such axial rotation of the axle 22 being permitted as may be accommodated in the bearings associated with these rods. Similarly, these pairs of axle supporting rods act to positively determine the rotative positions of axle 22 relative to the frame 20 during any vertical movement of axle 22 which may occur relative to the frame 20. It is noted that a vertical movement of axle 22 relative to the frame 20 is accompanied by a limited axial rotation of the former, resulting from the fact that the bearings 64, 66, 68 and 70 move on the arc of a circle instead of rectilinearly. It is found in practice, however, that by properly proportioning the length of the axle supporting rods and the spacing between the pairs of pivots such as 64 and 68, any such axial rotation of the axis may be reduced to a negligible value.

In addition to determining the rotative position of the axle 22 relative to the frame 20, it will be appreciated that the axle supporting rods also serve as so-called ride stabilizers, by virtue of the intermediate connecting portions 76 and 78, and act to tend to cause any vertical movement of one wheel relative to the frame 20 to be accompanied by corresponding movement of the other wheel. For example, assuming that one of the wheels 34 rises with respect to the frame 20, or that the corresponding side of the frame 20 tends to tilt downwardly toward such wheel, the rods 26 and 28, or 30 and 32, at the corresponding side of the vehicle, are caused to rotate about the bearings 52 associated therewith. This rotation, if unaccompanied by a corresponding rotation of the rods on the opposite side of the vehicle, torsionally stresses the connecting portions 76 and 78, which torsional stress tends to cause a corresponding rotation of the rods at such opposite sides.

Referring now to the embodiment shown in Figs. 5, 6, and 7, the arrangement and operation is broadly the equivalent of that described above with reference to the embodiment of Figs. 1 through 4, and corresponding reference characters with the subscript a are used where applicable. In Figs. 5, 6 and 7, however, both axle supporting bars of each pair are pivoted to the